United States Patent
Bunnell et al.

(10) Patent No.: US 9,151,253 B2
(45) Date of Patent: Oct. 6, 2015

(54) RAIN DEFLECTOR FOR AN INTAKE DUCT OF A WORK VEHICLE

(71) Applicant: CNH America, LLC, New Holland, PA (US)

(72) Inventors: Michael C. Bunnell, Clarendon Hills, IL (US); Aaron Richard, Berwyn, IL (US); Thomas M. Chlystek, Darien, IL (US); Mark D. Klassen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/014,577

(22) Filed: Aug. 30, 2013

(65) Prior Publication Data

US 2014/0150384 A1    Jun. 5, 2014

Related U.S. Application Data

(60) Provisional application No. 61/731,682, filed on Nov. 30, 2012.

(51) Int. Cl.
| | |
|---|---|
| *F02M 35/022* | (2006.01) |
| *F02M 35/02* | (2006.01) |
| *F02M 35/024* | (2006.01) |
| *F02M 35/08* | (2006.01) |
| *F02M 35/10* | (2006.01) |
| *B60K 15/063* | (2006.01) |
| *F02M 35/16* | (2006.01) |

(52) U.S. Cl.
CPC .......... *F02M 35/0226* (2013.01); *B60K 15/063* (2013.01); *F02M 35/024* (2013.01); *F02M 35/0216* (2013.01); *F02M 35/088* (2013.01); *F02M 35/10013* (2013.01); *F02M 35/10262* (2013.01); *B60K 2015/0639* (2013.01); *F02M 35/164* (2013.01); *Y02T 10/146* (2013.01)

(58) Field of Classification Search
CPC ........ B01D 50/00; B60K 11/04; B60K 11/08; B60K 13/02; F02M 35/161; F24F 7/00; F24F 13/082; F24F 2221/52
USPC ......... 55/385.3, 385.4; 95/268; 454/277, 365, 454/366, 367, 339, 341, 356, 368; 52/57, 52/199; 210/155; 180/68.3
See application file for complete search history.

(56) References Cited

U.S. PATENT DOCUMENTS

| | | | | |
|---|---|---|---|---|
| 3,818,667 | A * | 6/1974 | Wagner | 52/473 |
| 4,366,878 | A | 1/1983 | Warf | |
| 4,420,057 | A | 12/1983 | Omote et al. | |
| 4,516,650 | A | 5/1985 | Yamaguchi et al. | |
| 4,817,976 | A * | 4/1989 | Kingsley | 280/154 |
| 7,740,530 | B2 * | 6/2010 | Astourian | 454/277 |
| 2011/0048368 | A1 * | 3/2011 | Nelson et al. | 123/198 E |
| 2011/0214403 | A1 | 9/2011 | Geiss et al. | |
| 2011/0250832 | A1 | 10/2011 | Mayr et al. | |
| 2011/0252756 | A1 | 10/2011 | Geiss et al. | |
| 2012/0211293 | A1 * | 8/2012 | Leanza et al. | 180/68.3 |
| 2013/0319242 | A1 * | 12/2013 | Cruz Aguado | 96/7 |

* cited by examiner

*Primary Examiner* — Duane Smith
*Assistant Examiner* — Minh-Chau Pham
(74) *Attorney, Agent, or Firm* — Sue C. Watson

(57) ABSTRACT

An intake duct for an air intake system of a work vehicle is disclosed. The intake duct may generally include a body defining an air passage extending between an intake end and an outlet end. The body may further define a recessed intake at the intake end including a first side section and a second side section. Each of the first side section and the second side may define at least one side opening for directing air into the air passage. In addition, the recessed intake may include a deflector projecting outwardly from the first and second side sections. The deflector may be configured to shield the air passage from water directed towards the recessed inlet.

9 Claims, 7 Drawing Sheets

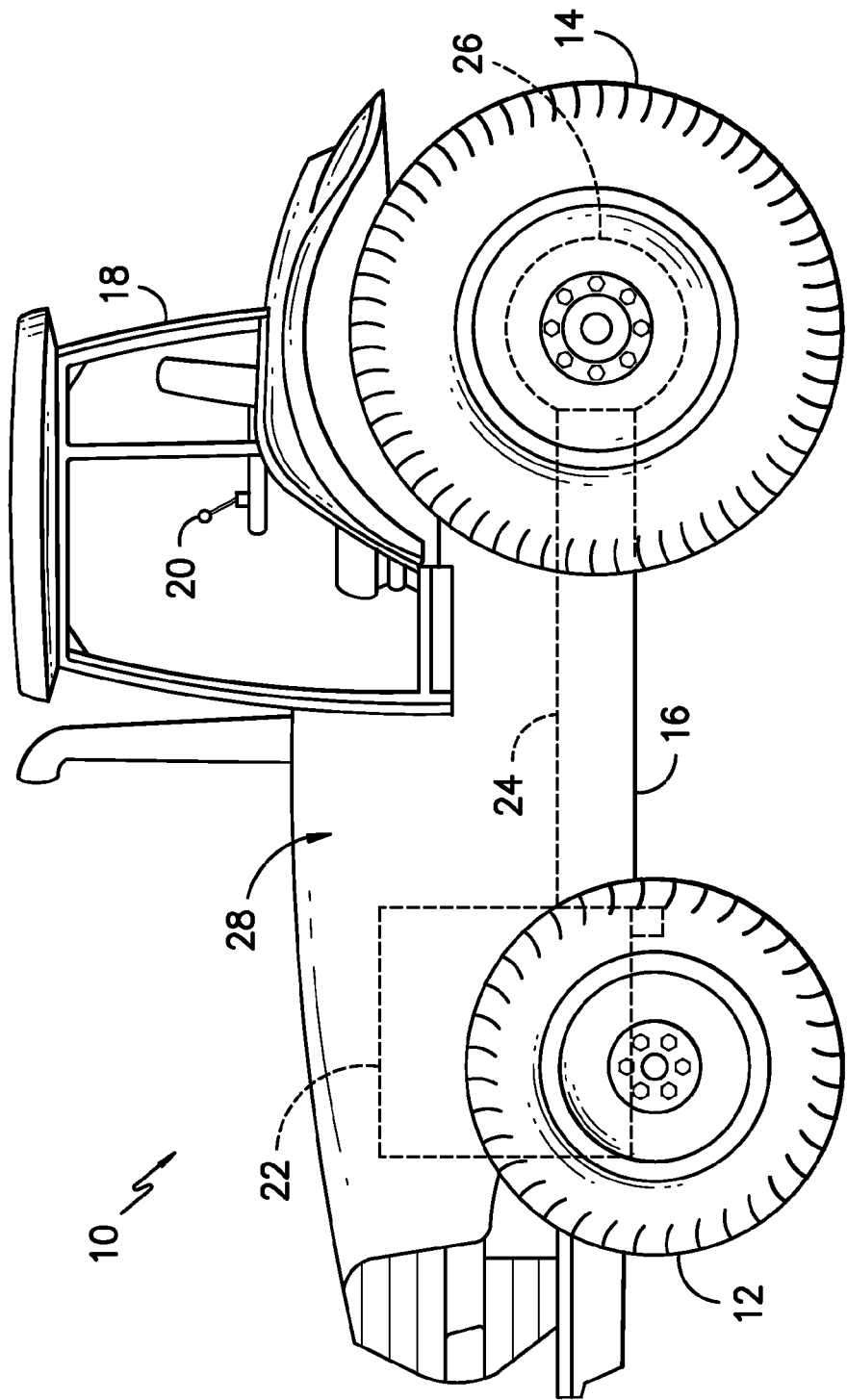
FIG. -1-

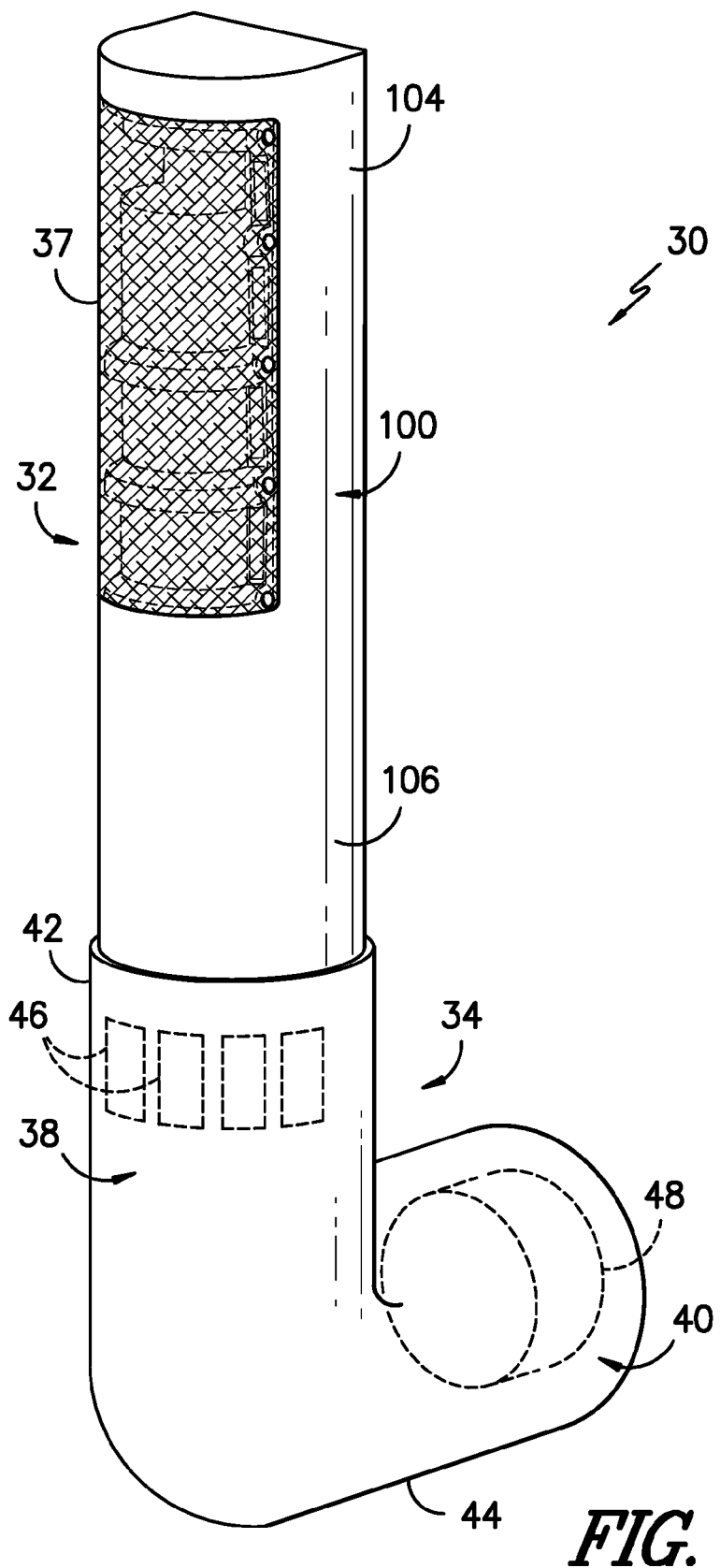
FIG. -2-

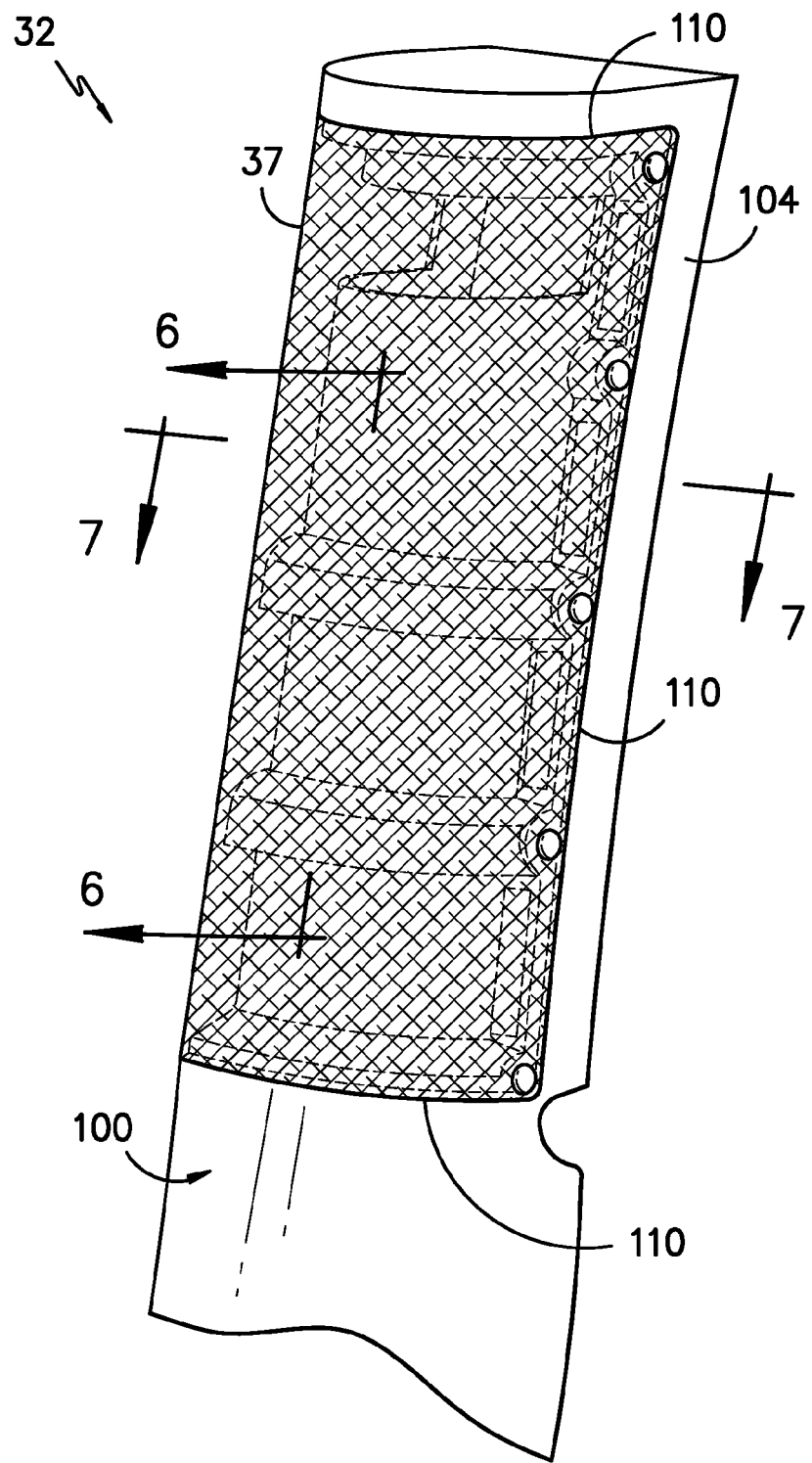
FIG. -3-

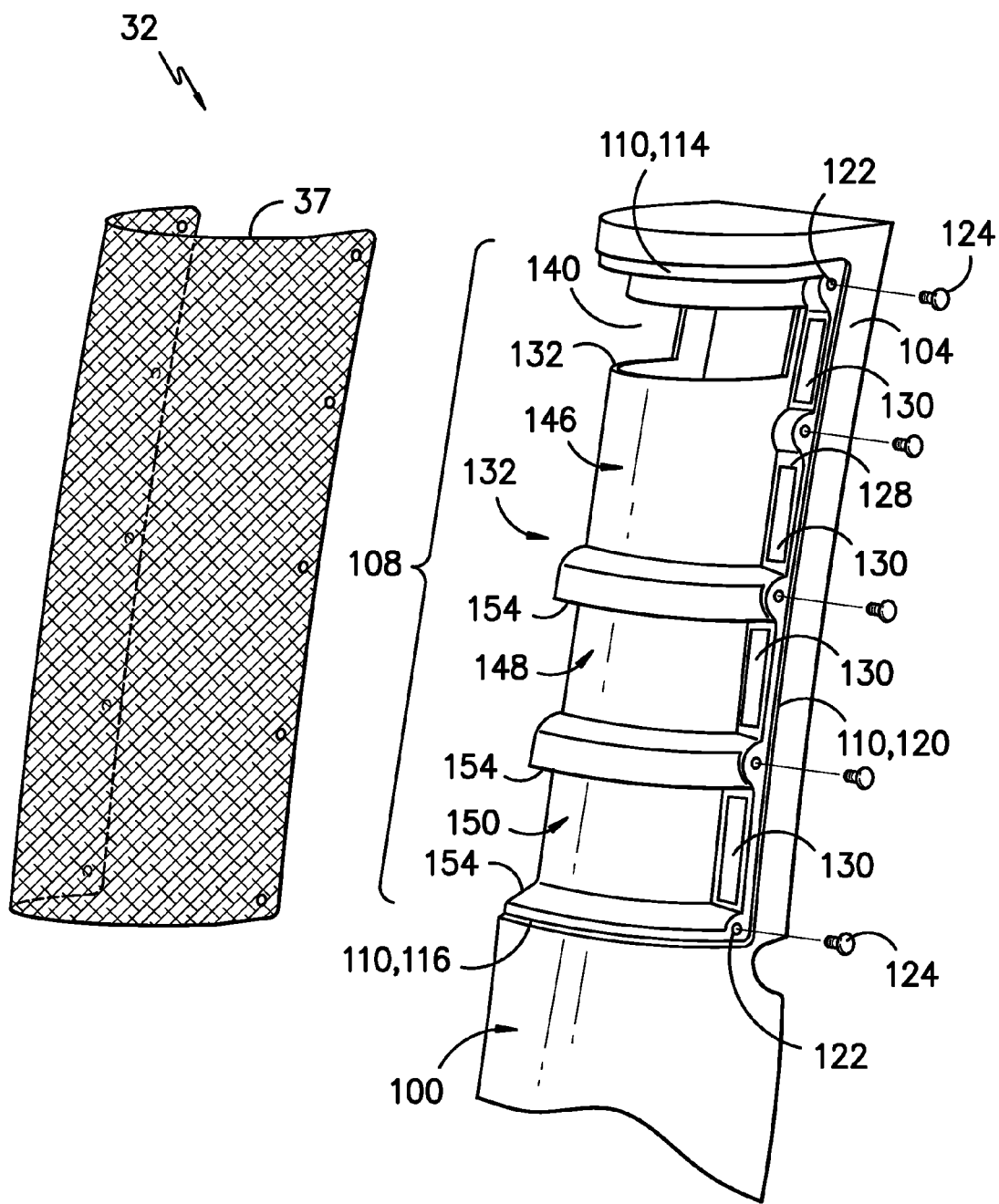
FIG. —4—

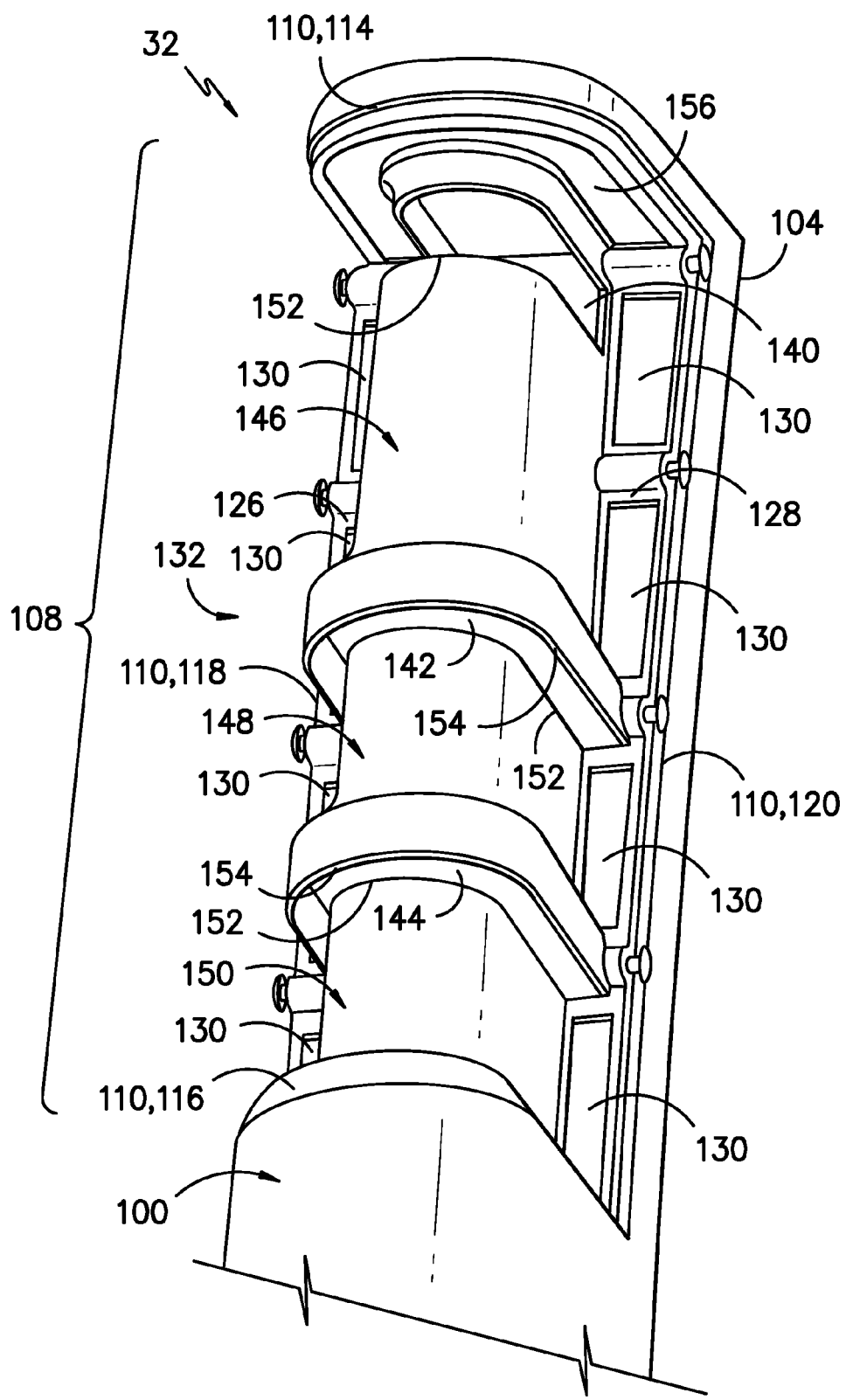
FIG. -5-

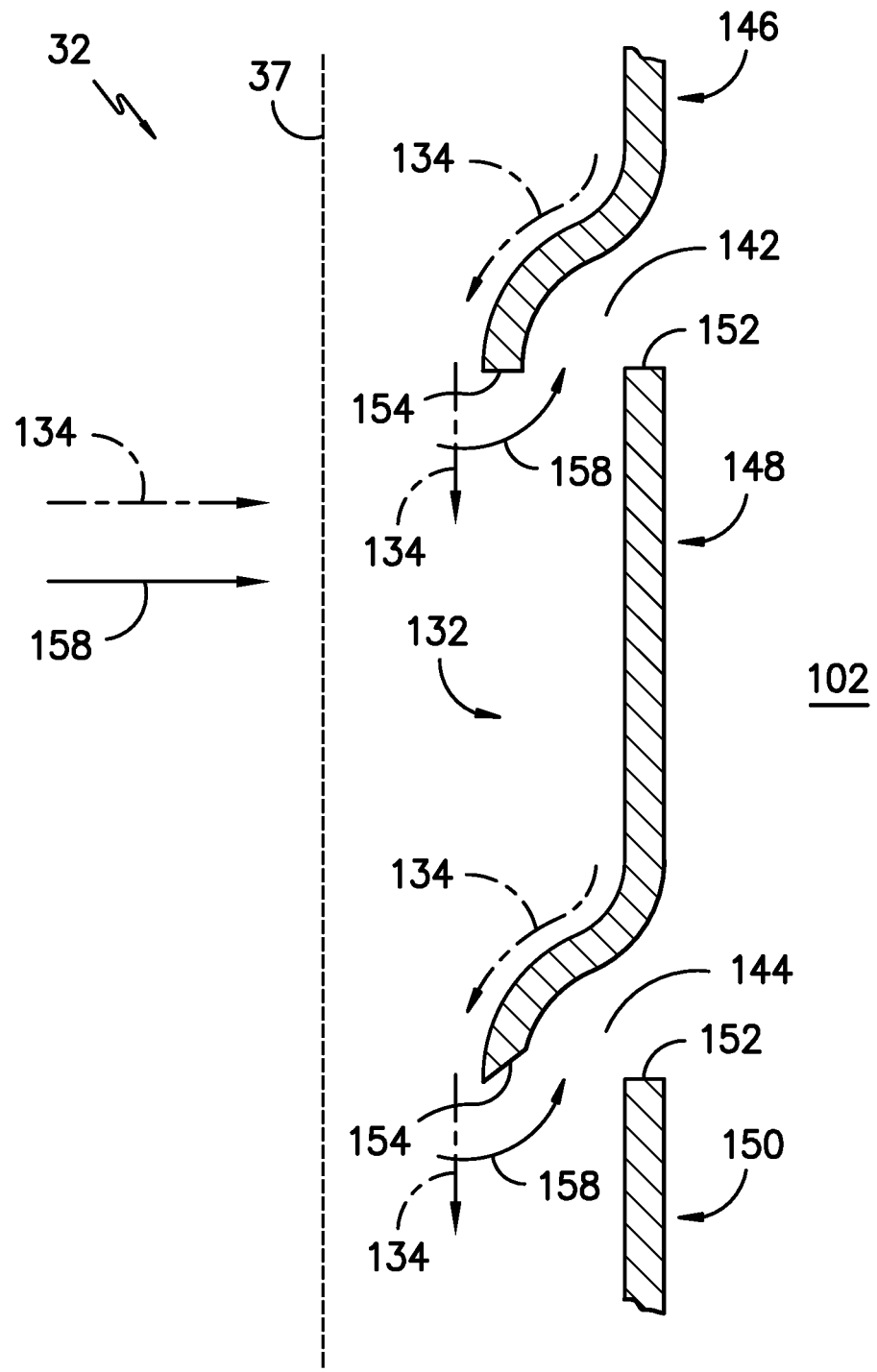
FIG. —6—

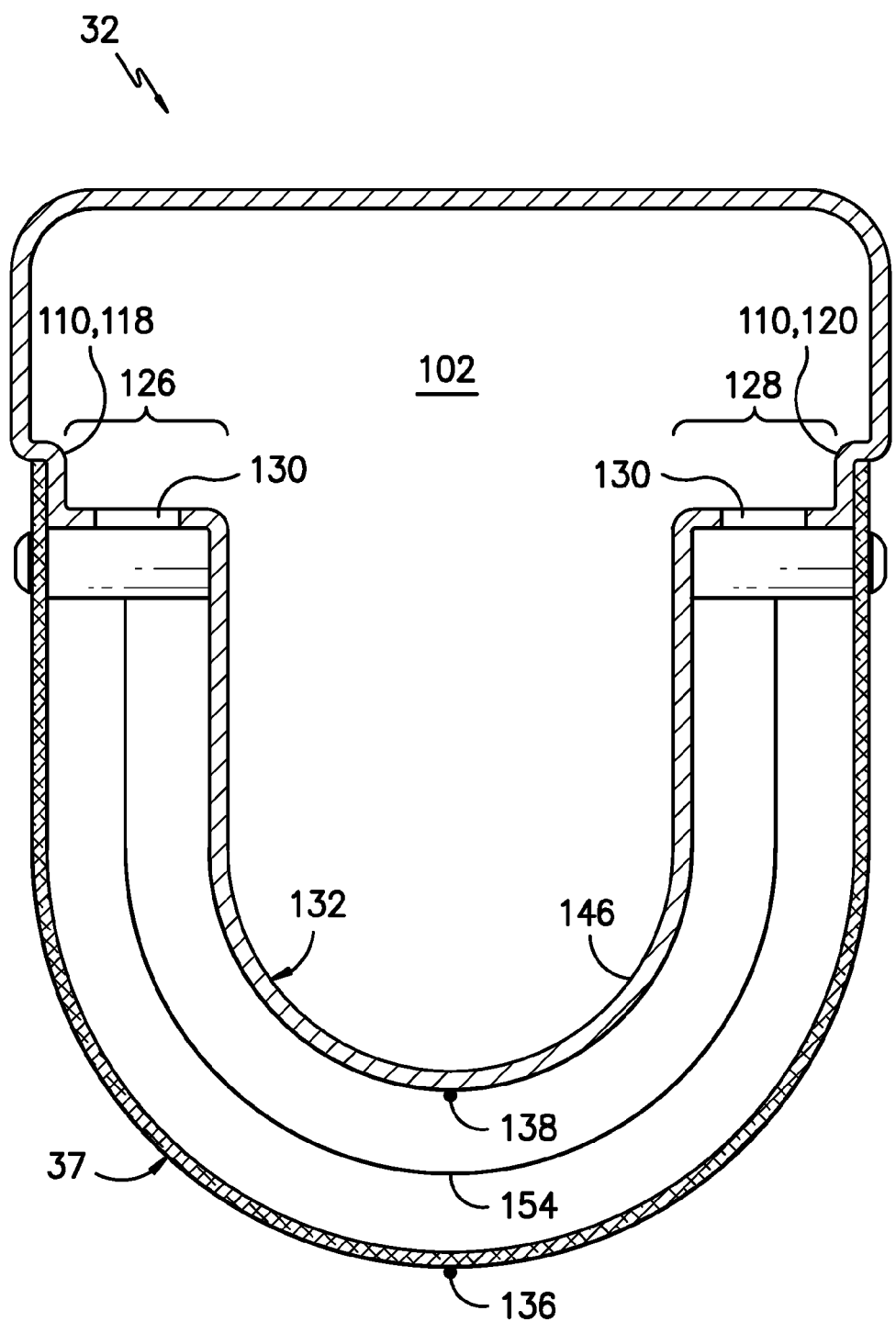
FIG. —7—

RAIN DEFLECTOR FOR AN INTAKE DUCT OF A WORK VEHICLE

CROSS-REFERENCE TO RELATED APPLICATIONS

This application is based upon and claims priority to U.S. Provisional Application No. 61/731,682, filed on Nov. 30, 2012, the disclosure of which is hereby incorporated by reference herein in its entirety for all purposes.

FIELD OF THE INVENTION

The present subject matter relates generally to work vehicles and, more particularly, to an intake duct for an air intake system of a work vehicle having a rain deflector configured to reduce the amount of water entering the air intake system.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

The air intake system of a work vehicle may also include an intake duct extending horizontally and/or vertically from the filter assembly to a location adjacent to the vehicle's cab. To allow for a sufficient amount of air to enter the intake duct, a relative large opening must be defined at the upper end of the duct. Unfortunately, such a large opening increases the likelihood that debris and/or water (e.g., rain water) may enter the intake duct and flow into the filter assembly, which can significantly shorten the component life of the air filter. To at least partially address this issue, a mesh screen is typically disposed over the opening to shield the intake duct from large debris. However, the screen is incapable of preventing water from entering the intake duct and flowing into the filter assembly.

Accordingly, an intake duct for an air intake system having a rain deflector configured to reduce the amount of water flowing into the system would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an intake duct for an air intake system of a work vehicle. The intake duct may generally include a body defining an air passage extending between an intake end and an outlet end. The body may further define a recessed intake at the intake end including a first side section and a second side section. Each of the first side section and the second side may define at least one side opening for directing air into the air passage. In addition, the recessed intake may include a deflector projecting outwardly from the first and second side sections. The deflector may be configured to shield the air passage from water directed towards the recessed inlet.

In another aspect, the present subject matter is directed to an air intake system for a work vehicle. The air intake system may generally include an intake duct defining an air passage extending between an intake end and an outlet end. The intake duct may further define a recessed intake at the intake end include a first side section and a second side section. Each of the first side section and the second side defining at least one side opening for directing air into the air passage. The recessed intake may also include a deflector projecting outwardly from the first and second side sections. The deflector may be configured to shield the air passage from water directed towards the recessed inlet. Additionally, the air intake system may include a filter assembly in flow communication with the outlet end of the intake duct. The filter assembly may be configured to filter the air received within the intake duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle;

FIG. 2 illustrates a perspective view of one embodiment of an air intake system suitable for use with the work vehicle shown in FIG. 1;

FIG. 3 illustrates a perspective view of one embodiment of an intake duct suitable for use with the air intake system shown in FIG. 2;

FIG. 4 illustrates a partial, side perspective view of the intake duct shown in FIG. 3, particularly illustrating a screen of the air intake system exploded away from the intake duct;

FIG. 5 illustrates a partial, front perspective view of the intake duct shown in FIG. 4;

FIG. 6 illustrates a cross-sectional view of the intake duct shown in FIG. 3 taken about line 6-6; and FIG. 7 illustrates a cross-sectional view of the intake duct shown in FIG. 3 taken about line 7-7.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an intake duct for an air intake system of a work vehicle. In several embodiments, the intake duct may include a recessed intake defining a plurality of openings configured to receive air from the outside environment. In addition, the recessed intake may include a rain deflector configured to deflect water away from one or more of the openings, thereby reducing the amount of water entering the intake duct.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, all-terrain vehicles, off-road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10.

Referring now to FIG. 2, a perspective view of one embodiment of an air intake system 30 suitable for use with the work vehicle 10 shown in FIG. 1 is illustrated in accordance with aspects of the present subject matter. As shown in FIG. 2, the air intake system 30 may generally include an intake duct 32 and a filter assembly 34 in flow communication with the intake duct 32. The intake duct 32 may generally be configured to receive dirty air flowing outside the work vehicle 10 and direct such dirty air into the filter assembly 34 for cleaning/filtering before delivering the cleaned air to the engine 22. Thus, in several embodiments, the intake duct 32 may generally comprise an elongated, conduit-like body defining one or more openings (not shown) for receiving air. Additionally, as shown in FIG. 2, a screen 37 may be disposed over the openings, thereby preventing large debris from entering the intake duct 32. As will be described below with reference to FIGS. 3-7, the intake duct 32 may also include an integrated rain deflector configured to reduce the amount of water that enters the intake duct 32 via the openings.

The filter assembly 34 of the air intake system 30 may generally be configured to receive the dirty air from the intake duct 32 and clean/filter such air for subsequent delivery to the engine 22. Thus, in several embodiments, the filter assembly 34 may include a pre-cleaner 38 and an air filter 40 disposed downstream of the pre-cleaner 38. In addition, the filter assembly 34 may include a pre-cleaner housing 42 configured to encase the pre-cleaner 38 and a filter housing 44 configured to encase the air filter 40. It should be appreciated that the pre-cleaner housing 42 and the filter housing 44 may be formed integrally with one another (e.g., by forming both housings 42, 44 as a single continuous housing) or the pre-cleaner housing 42 and the filter housing 44 may comprise separate components configured to be separately coupled to one another.

As shown in FIG. 2, in several embodiments, the pre-cleaner housing 42 and the filter housing 44 may be oriented generally perpendicularly to one another such that the filter assembly 34 generally defines an "L" shape. As such, the air flowing into the intake duct 32 may be directed generally vertically downward through the pre-cleaner 38 and then generally horizontally through the air filter 40. However, in other embodiments, the pre-cleaner housing 42 and the filter housing 44 may have any other suitable orientation relative to one another. For example, in another embodiment, the pre-cleaner housing 42 and the filter housing 44 may be aligned along a common axis such that air flowing through the filter assembly 34 is directed continuously along such axis.

As is generally understood, the pre-cleaner 38 may be configured to remove large size debris dust contained within the air flowing into the filter assembly 34 via the intake duct 32. Specifically, in several embodiments, the pre-cleaner 38 may include a plurality of tubes (e.g., turbo tubes), dirt separators, and/or any other suitable pre-cleaner elements 46 configured to separate particulates from the air via centripetal force. For example, the pre-cleaner elements 46 may be configured to impart a vortex or spinning motion to the flow of air entering the filter assembly 34.

As a result, large particulates contained within the air may be forced radially outwardly along the inner wall of the pre-cleaner housing 42 by the centripetal force of the vortex/spinning motion. These large particulates may then be expelled from the filter assembly 34 via an outlet port (not shown) defined in the pre-cleaner housing 42.

Additionally, the air filter 40 may generally be configured to receive the cleaned air flowing from the pre-cleaner 38 and filter such air to provide a final stage of filtering prior to delivery of the air to the engine 22. Thus, as shown in FIG. 2, the air filter 40 may generally include one or more filter elements 48 configured to catch or trap the remaining particulates contained within the cleaned air. For instance, in several embodiments, the filter element(s) 48 may be made from a fibrous, porous or mesh material that allows air to pass therethrough while catching/trapping any particulates. The cleaned/filtered air may then be directed through a suitable conduit (not shown) to the engine 22, where the air may be mixed with fuel and combusted.

Referring now to FIGS. 3-7, several views of one embodiment of the intake duct 32 shown in FIG. 2 are illustrated in accordance with aspects of the present subject matter. Specifically, FIG. 3 illustrates a partial, side perspective view of the intake duct 32 having the screen 37 installed onto the duct 32. FIG. 4 illustrates a partial, side perspective view of the intake duct 32 shown in FIG. 3 with the screen 37 being exploded away from the duct 32. FIG. 5 illustrates a partial, front perspective view of the intake duct shown in FIG. 4. Additionally, FIGS. 6 and 7 illustrate cross-sectional views of the intake duct 32 shown in FIG. 3 taken about lines 6-6 and 7-7, respectively.

In general, the intake duct 32 may generally comprise an elongated body 100 defining an air passage 102 (shown in FIGS. 6 and 7) extending between an intake end 104, where air is directed into the air passage 102, and an outlet end 106, where the air flowing through the air passage 102 is directed into the filter assembly 34 (FIG. 2). Additionally, in several embodiments, a portion the body 100 at the intake end 104 may be recessed so as to define a recessed intake 108. For example, as shown in FIGS. 4 and 5, the intake duct 32 may include an outer edge 110 from which a portion of the body 100 extends inwardly relative to the remainder of the body 100, thereby forming the recessed intake 108. Thus, it should be appreciated that the outer edge 110 may generally define the outer perimeter of the recessed intake 108 such that the recessed intake 108 corresponds to the portion of the body 100 that is recessed relative to the outer edge 110. For example, as shown in FIGS. 4 and 5, the outer edge 110 generally extends along a top 114 and a bottom 116 of the recessed intake 108, as well as a first side 118 and a second side 120 of the recessed intake 108.

It should be appreciated that the screen 37 of the air intake system 30 may, in several embodiments, be configured to be coupled to the body 100 around the outer edge 110 so as to extend over and cover the recessed intake 108. For example, as shown in FIG. 4, the screen 37 may be configured to define a curved or semi-curved shape (e.g., a "U-shape") generally corresponding to the shape of the body 100 such that, when the screen 37 is coupled to the body 100 along the outer edge 100, the screen 37 may generally form an extension of the non-recessed portion of the body 100 (e.g., by defining a flush interface with the body 100). However, in other embodiments, the screen 37 may define any other suitable shape. Moreover, the screen 37 may be configured as a single continuous screen or as multiple screens configured to cover the recessed intake 108.

Additionally, it should be appreciated that the screen 37 may be configured to be coupled to the body 100 using any suitable attachment means known in the art. For example, as shown in FIG. 4, in one embodiment, a plurality of fastener openings 122 may be defined at the outer edge 110 along the first and second sides 118, 120 of the recessed intake 108 that are configured to receive suitable mechanical fasteners 124 (e.g., bolts, screws, pins and/or the like) for coupling the screen 37 to the body 100. In other embodiments, the screen 37 may be configured to be adhered to the body 100 along the outer edge 110 and/or secured to the body 100 using any other suitable attachment means.

In several embodiments, the recessed intake 108 may include a first side section 126 and a second side section 128 projecting inwardly from the outer edge 110, with each side section 26, 128 defining one or more side openings 130 configured to direct the air passing through the screen 37 into the air passage 102. For example, as shown in FIGS. 5 and 7, the first side section 126 may project inwardly from the outer edge 110 along the first side 118 of the recessed intake 118 such that the first side section 126 generally lies in a plane (e.g., a vertical plane) extending between the top 114 and the bottom 116 of the recessed intake 108. Similarly, the second side section 130 may project inwardly from the outer edge 110 along the second side 120 of the recessed intake 108 such that the second side section 128 generally lies in a plane (e.g., a vertical plane) extending between the top 114 and the bottom 116 of the recessed intake 108. In such an embodiment, the first and second side sections 126, 128 may, for instance, be oriented parallel relative to another and may be disposed within the same or in different planes. Alternatively, the first and second side sections 126, 128 may define a non-planar orientation between the top 114 and the bottom 116 of the recessed intake 108.

It should be appreciated that number of side openings 130 may be defined in the first and second side sections 126, 128 of the recessed intake 108. For example, as shown in FIG. 5, four side openings are defined in each side section 126, 128. However, in other embodiments, the first and second side sections 126, 128 may define less than four side openings 130 or greater than four side openings 130. It should also be appreciated that the recessed intake 108 may also define other openings around its periphery for directing air into the air passage 102. For example, as shown in FIG. 5, an opening 156 (e.g., a "U-shaped" opening) may be defined at the very top of the recessed intake 108.

Additionally, in accordance with aspects of the present subject matter, the recessed intake 108 may also include a rain deflector 132 projecting outwardly from the first and second side sections 126, 128. In general, the deflector 132 may be configured to serve as a water shield for reducing the amount of water entering the air passage 102. For example, as particularly shown in FIG. 6, water (indicated by arrows 134) passing through the screen 37 may contact the deflector 132 and be deflected/flow downward along the deflector 132. The water may then flow back through the screen 37 at the bottom 116 of the recessed intake 108. For instance, as shown in FIG. 5, the bottom 116 of the recessed intake 108 may be angled downward from the deflector 132 in the direction of the outer edge 110 such that water falling to the bottom 116 may be directed outwards towards the screen 37.

In several embodiments, the deflector 132 may be configured to project outwardly from the first and second side sections 126, 128 such that at least a portion of the deflector 132 is positioned closer to a center or apex point 136 of the screen 37 than the side sections 126, 128. For example, as shown in FIG. 7, the deflector 132 may project outwardly from the first and second side sections 126, 128 in the direction of the screen 37 so as to define a partially curved or "U-shape," with an apex point 138 of the deflector 132 being generally aligned with the apex point 136 of the screen 37. In such an embodiment, since a front portion of the screen 37 (centered about the apex point 136) is positioned closer to the deflector 132 than to the side sections 126, 128, water directed through the front of the screen 37 may be more likely to contact the deflector 132, thereby reducing the amount of water entering the air passage 102 through the side openings 130.

Moreover, in several embodiments, the deflector 132 may define one or more deflector openings 140, 142, 144 configured to direct air passing through the screen 37 into the air passage 102. In such embodiments, the deflector openings 140, 142, 144 may generally be positioned and/or oriented along the deflector 132 in a manner that prevents a significant amount of water from being directed into the openings 140, 142, 144. For example, as shown in FIGS. 4 and 5, in one embodiment, an upper deflector opening 140 may be defined at the top of the deflector 132. Such opening 140 may generally be shielded from water by the top of the intake duct 32 and the screen 37. For example, even in windy rain storms in which rain water is being directed almost horizontally, the screen 37 may reduce the velocity of the water sufficiently such that, given the recessed position of the upper deflector opening 140 relative to the screen 37, the water will fall below the opening 140 and contact a lower portion of the deflector 132.

Additionally, one or more deflector openings 142, 144 may also be defined between separated portions of the deflector 132. For example, as shown in FIG. 5, in one embodiment, the deflector 132 may be partially separated or divided along its length into a plurality of deflector portions (e.g., a first deflector portion 146, a second deflector portion 148, and a third deflector portion 150), with each deflector portion 146, 148, 150 extending vertically between a top edge 152 and a bottom edge 154. In such an embodiment, the upper deflector portions 146, 148 may be flared relative to the lower deflector portions 148, 150 such that deflector openings 142, 144 are defined between the adjacent deflector portions 146, 148, 150. For example, as shown in FIGS. 4-6, the first deflector portion 146 may be flared outwardly at its bottom edge 154 relative to the top edge 152 of the second deflector portion 148 such that a first deflector opening 142 is defined between the first and second deflector portions 146, 148. Similarly, the second deflector portion 148 may be flared outwardly at its bottom edge 154 relative to the top edge 152 of the third deflector portion 150 such that a second deflector opening 144 is defined between the second and third deflector portions 148, 150.

By configuring the deflector portions 146, 148, 150 as described above, the first and second deflector openings 142, 144 may be shielded from water by the deflector 132. Specifically, by flaring out the first and second deflector portions 146, 148 at their bottom edges 154, water flowing downward along the deflector 132 may be directed away from the deflector openings 142, 144. For example, as shown in FIG. 6, the water 134 flowing along the deflector 132 may fall or drip downward at the bottom edges 154 of the first and second deflector portions 146, 148 without entering the first and second deflector openings 142, 144. However, air flowing through the screen (indicated by arrows 158 in FIG. 6) may be directed between the adjacent edges 152, 154 of the deflection portions 146, 148, 150 and into the air passage 102.

Additionally, the relative positioning of the top and bottom edges 152, 154 of the adjacent deflector portions 146, 148, 150 may also be selected to further prevent water from entering the first and second deflector openings 142, 144. For example, as shown in FIG. 6, in one embodiment, the bottom edges 154 of the first and second deflector portions 146, 148 may be horizontally aligned with the top edges 152 of the second and third deflector portions 148, 150, respectively. Alternatively, the deflector portions 146, 146, 148 may be configured to be slightly overlapped such that the bottom edges 154 of the first and second deflector portions 146, 148 extend vertically below the top edges 152 of the second and third deflector portions 148, 150, respectively.

It should be appreciated that, to prevent water from flowing around the bottom edges 154 of the upper deflector portions 146, 148 and being sucked into the first and second deflector openings 142, 144, each bottom edge 154 may, in one embodiment, be configured to define a non-rounded shape such that any water flowing along the upper deflector portions 146, 148 actually drips from the bottom edges 154. For instance, FIG. 6 illustrates two examples of suitable non-rounded shapes. As shown, the bottom edge 154 of the first deflector portion 142 defines a squared edge with 90 degree corners while the bottom edge 154 of the second deflector portion 148 defines a sharp edge tapering to a point. However, in other embodiments, the bottom edges 154 may define any other suitable shape Additionally, it should also be appreciated that, although the illustrated embodiment shows the deflector 132 as including three deflector portions 146, 148, 150 with two deflector openings 142, 144 being defined between each pair of adjacent deflector portions, the deflector 132 may generally be configured to include any number of deflector portions defining any number of deflector openings therebetween.

Moreover, it should be appreciated that, in several embodiments, the body 100 of the intake duct 32 may generally be formed as a single, molded component. Thus, the deflector 132 may be formed integrally with the side sections 126, 128 and the remainder of the body 100. However, in alternative embodiment, the deflector 132 may be configured to be separately attached within the recessed intake 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An intake duct for an air intake system of a work vehicle, the intake duct comprising:
    an elongated body defining an air passage extending between an intake end and an outlet end, the elongated body further including
    a recessed intake at the intake end including a first side section and a second side section, at least one of the first side section or the second side defining an opening for directing air into an air passage, the recessed intake further including
    a deflector projecting outwardly from the first and second side sections, the deflector being configured to shield the air passage from water directed towards the recessed inlet; the deflector comprising at least a first deflector portion extending between a top edge and a bottom edge and at least a second deflector portion extending between a top edge and a bottom edge, the first deflector portion being flared outwardly at its bottom edge relative to the top edge of the second deflector portion such that a first deflector opening which is in communication with the air passage is defined between first and second deflector portions, wherein the bottom edge of the first deflector portion is horizontally aligned with or disposed vertically below the to edge of the second deflector portion, the first deflector portion configured to deflect horizontally driven water downward due this alignment with the top edge of the second deflector; and
    a screen covering at least the recessed intake and the first deflector portion and the second deflector portion, the deflector projecting outwardly from first and second side sections in the direction of the screen, and the screen providing at least a partial deflection of water away from the elongated body of the intake duct.

2. The intake duct of claim 1, wherein the deflector is configured to project outwardly from the first and second side sections so as to define an at least partially curved shape between the first and second side sections.

3. The intake duct of claim 1, wherein the recessed intake defines an outer edge, the screen being coupled to the body around the outer edge.

4. The intake duct of claim 1, wherein the bottom edge of the first deflector section defines a non-rounded shape.

5. The intake duct of claim 1, wherein the deflector further includes a third deflector portion extending between a top edge and a bottom edge, the second deflector portion being flared outwardly at its bottom edge relative to the top edge of the third deflector portion such that a second deflector opening is defined between the second and third deflector portions.

6. An air intake system for a work vehicle, the air intake system comprising:
    an elongated body including an intake duct comprising an air passage extending between an intake end and an outlet end; including
    a deflector projecting outwardly from the first and second side sections, the deflector being configured to shield the air passage from water, the deflector comprising
    at least a first deflector portion extending between a top edge and a bottom edge and at least a second deflector portion extending between a top edge and a bottom edge, the first deflector portion being flared outwardly at its bottom edge relative to the to edge of the second deflector portion such that a first deflector opening is defined between first and second deflector portions, the first deflector opening in communication with an air passage which extends from the intake end through the outlet end, wherein the bottom edge of the first deflector portion is horizontally aligned with or disposed vertically below the top edge of the second deflector portion, the first deflector portion configured to deflect horizontally driven water downward due this alignment with the top edge of the second deflector; and a screen covering at least the deflector and connected to at least a portion of the elongated body, the deflector projecting outwardly in the direction of the screen.

7. The air intake system of claim 6, wherein the deflector is configured to project outwardly from the first and second side sections so as to define an at least partially curved shape between first and second side sections.

8. The air intake system of claim 6, wherein the bottom edge of the first deflector section defines a non-rounded shape.

9. The air intake system of claim 6, wherein the deflector further includes a third deflector portion extending between a top edge and a bottom edge, the second deflector portion being flared outwardly at its bottom edge relative to the top edge of the third deflector portion such that a second deflector opening is defined between the second and third deflector portions.

* * * * *